United States Patent [19]

Lemelson

[11] Patent Number: 4,671,111
[45] Date of Patent: Jun. 9, 1987

[54] VEHICLE PERFORMANCE MONITOR AND METHOD

[76] Inventor: Jerome H. Lemelson, 48 Parkside Dr., Princeton, N.J. 08540

[21] Appl. No.: 660,107

[22] Filed: Oct. 12, 1984

[51] Int. Cl.[4] ............................................. G01C 21/10
[52] U.S. Cl. ................................ 73/432.1; 340/52 R; 364/426
[58] Field of Search ................ 73/178 R, 505, 432 R, 73/117.2, 117.3; 340/995, 52 R; 364/436, 443, 453, 460, 426

[56] References Cited

U.S. PATENT DOCUMENTS 3,582,632  6/1971  Foster ............................. 364/424 X
4,220,994  9/1980  Hendrickson ................... 364/444 X
4,315,326  2/1982  Chase, Jr. ...................... 73/178 R X
4,510,803  4/1985  Perara ............................. 73/178 R
4,521,777  6/1985  Nakamura et al. ............. 364/460 X Primary Examiner—Jerry W. Myracle

[57] ABSTRACT

A vehicle performance monitor system employing one or more accelerometers operative to generate output signals of acceleration and deceleration of a vehicle as the vehicle operates, wherein such signals are electronically processed and either immediately analyzed by a computer prior to monitoring or recording same or are recorded and later analyzed by an onboard computer or a remote computer which communicates with a memory forming part of the system and located in the vehicle by pluggable lines or short wave communication.

18 Claims, 6 Drawing Figures

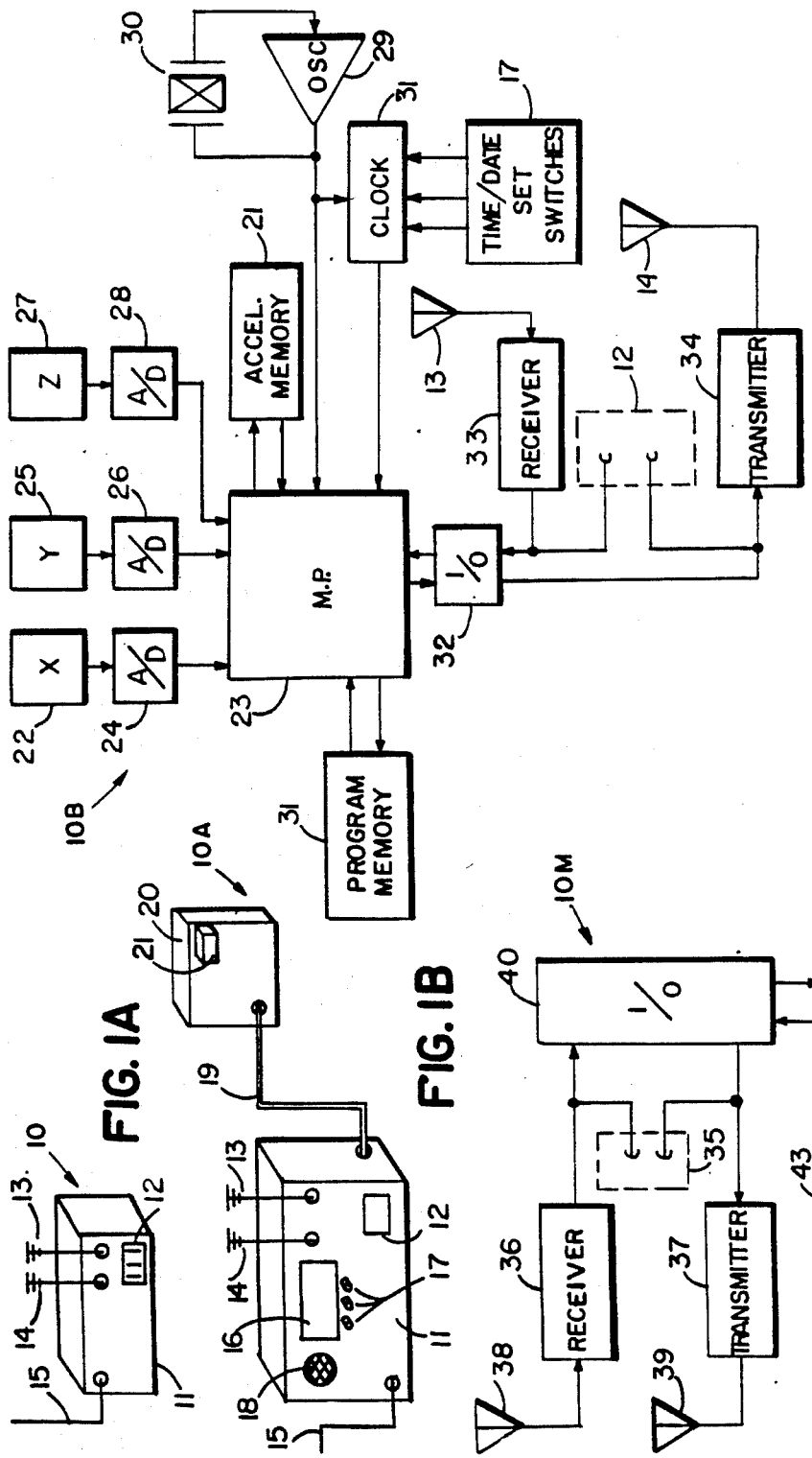

VEHICLE PERFORMANCE MONITOR AND METHOD

SUMMARY OF THE INVENTION

This invention relates to a system and method for analyzing a vehicle's performance, particularly with respect to its acceleration and deceleration during operation of the vehicle to determine the manner in which the vehicle is operated or driven. Analysis is made by a computer operative to receive signals generated either directly by one or more accelerometers or recordings from a memory which is adapted to receive such signals as they are generated or from a memory or to receive process signals obtained from the original signals. A single multiple access accelerometer or two or more accelerometers adapted to generate acceleration signals for accelerations in two or more directions, may be employed together with signals generated in sensing instant speeds, such as generated on the output of a speedometer. The computer analysis may determine the manner in which the vehicle is driven, either during a specific time interval or a number of time intervals or over a longer period of time wherein averaging is employed to determine the general performance or use of the vehicle. The results of such analysis may be employed to inform the operator of shortcomings in his operation of the vehicle or unsafe operation if such is effected and detected. In the event of an accident, a determination may be made by such analysis of the manner in which the vehicle was driven just prior to an accident to determine if the driver of the vehicle was guilty of careless or reckless driving.

Accordingly it is a primary object of this invention to provide a new and improved system and method for analyzing the performance of a vehicle, such as a motor vehicle, aircraft, boat or other form of vehicle over a period of time, during selected time intervals or during an interval just prior to a mishap or accident.

Another object is to provide a system and method for recording and analyzing information relating to accelerations and decelerations of a motor vehicle during its operation.

Another object is to provide a computer analysis system and method for analyzing the performance of a motor vehicle during its operation.

Another object is to provide a system and method for recording and analyzing the performance of a vehicle prior to an accident to attempt to determine the cause of the accident.

Another object is to provide a device for logging and recording data associated with the operation of a motor vehicle, employing microelectronic circuitry disposed in a housing which may be easily disposed in a motor vehicle, wherein the recorded data is easily and rapidly accessible for analysis and diagnostic purposes.

Another object is to provide an electronic system for monitoring the performance of motor vehicles from a central or remote locate without the need to use the operator of the vehicle to initiate or effect such monitoring.

With the above and such other objects in veiw as may hereinafter more fully appear, the invention consists of the novel constructions, combinations and arrangements of parts, electronic circuitry and methods for logging and monitoring data derived from sensors mounted in vehicles, as will be more fully described and illustrated in the accompanying drawings, but it is to be understood that changes, variations and modifications may be resorted to which fall within the scope of the invention as claimed.

BRIEF DESCRIPTION OF THE DRAWINGS

FIG. 1A is an isometric view of a module employed in a vehicle to detect variations in acceleration experienced by the vehicle as it travels during its normal operation.

FIG. 1B is an isometric view of a module and subsystem components which define a modified form of the embodiment shown in FIG. 1A.

FIG. 2 is a schematic diagram of electronic circuitry used in the detection systems of FIGS. 1A and 1B.

FIG. 3 is a schematic diagram of a subsystem employed with the modules shown in FIGS. 1A and 1B for querying the recorder of performance variables associated with an operating vehicle or one which is under inspection in a maintenance location.

In FIG. 1 is shown broad details of a first embodiment of the invention which includes recording and sensing components and attendant electronic circuitry forming a system 10 which is illustrated in greater detail in FIG. 2 and which is supported within a rectangular housing 11 formed of metal or plastic or of an encapsulating plastic material which completely surrounds the electronic circuitry therein. Secured to one wall of the housing 11 is a multiple connection socket 12 defining a data access port to which flexible output wires may be pluggably connected to permit the transfer of data recorded in the electronic circuitry within housing 11, to an external recorder, printer or display [not shown].

Figures 4, 5:
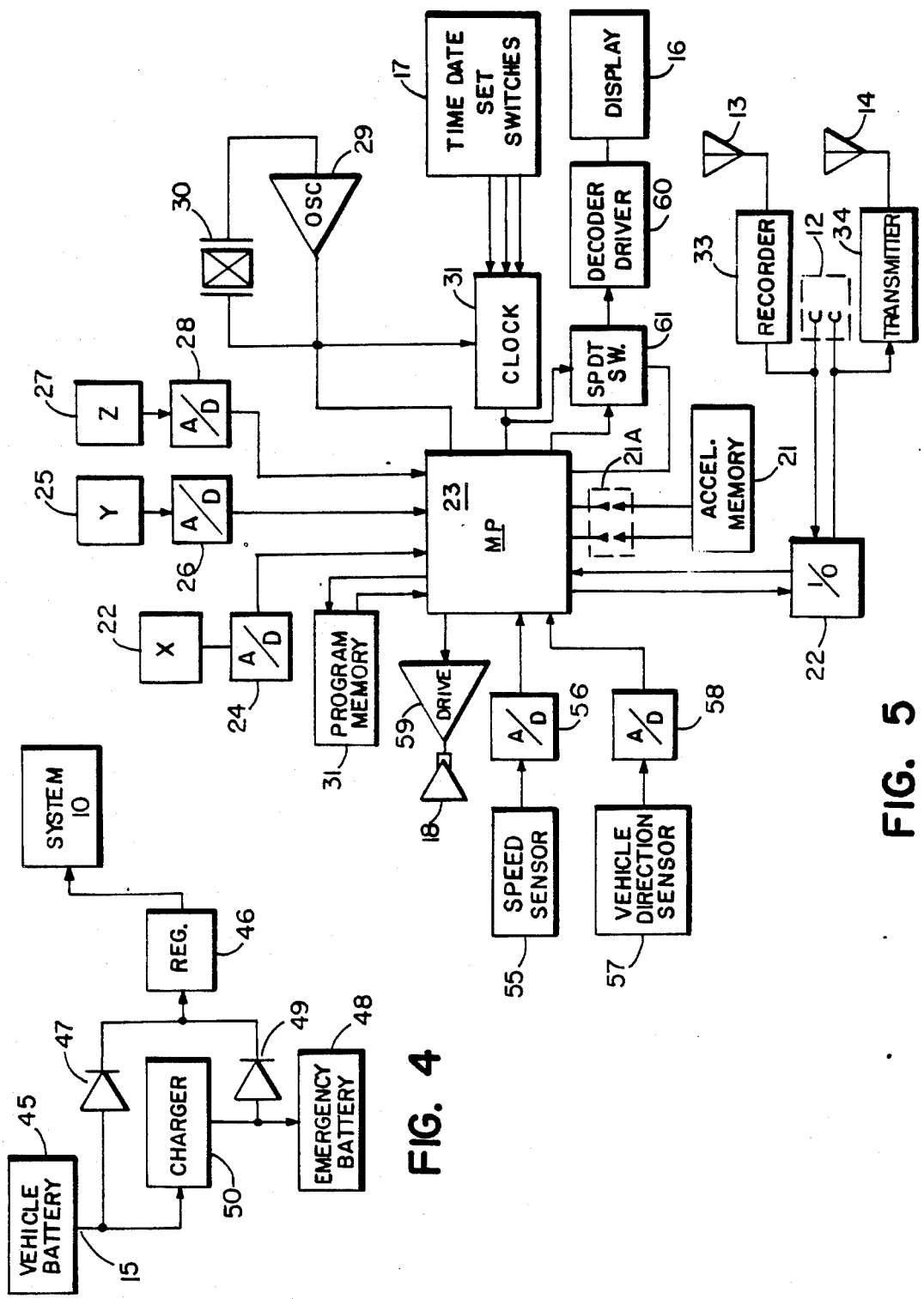
FIG. 4 is a schematic diagram showing certain details of a control system for the power supply for the data logging system of the performance monitoring system.
FIG. 5 is a schematic diagram of a modified form of the logging system of FIGS. 2 to 4.

Supported by a wall of housing 11 is a short wave receiving antenna 13 and a short wave transmitting antenna 14 which may be utilized for effecting the transfer of data recorded by suitable electronic circuit components, to be described, within housing 11. Notation 15 refers to a flexible power line extending to and supported at one end by a wall of housing 11 for supplying electrical energy from a source of such energy, such as a battery, to the components of electronic circuitry supported within housing 11.

In FIG. 1B is shown a modified form of the invention having features of the embodiment illustrated in FIG. 1 plus additional features for improving the operation of the invention. In addition to illustrating housing 11 and data access port or socket 12, the modified apparatus 10A of FIG. 1B contains a time-date data display 16 such as an alpha-numeric character LCD, LED or other form of variably controllable display for information. Also supported by housing 11 of FIG. 1B are a plurality of manually operable time-date setting switches 17 and an alarm 18 for indicating when the system detects dangerous operation of the vehicle with which it is associated or in which it is mounted. A multiple conductor cable 19 is also provided which connects the electronic components contained within housing 11 with one or more acceleration sensors contained within a housing 20 to which such cable is connected. Cable 19 also extends to a pluggable electronic memory 21 which will be described. Housing 20 may be mounted remote from housing 11 or adjacent thereto.

In FIG. 2, further details of the electronic circuitry 10B defining system 10 and supported within housing 11, are illustrated. An X-direction acceleration sensor 22, of known construction and operation, generates analog X-directional acceleration signals in response to X-directional acceleration sensed thereby, which X-directional acceleration signals are passed to an analog-to-digital converter 24 having its output connected to a microelectronic controller or microprocessor 23. Similarly, Y-direction accelerations are sensed by a second acceleration sensor 25, the output of which extends to an analog-to-digital converter 26 which outputs Y-directional acceleration signals in digital form to the microprocessor 23 while a Z-direction acceleration sensor 27 generates output analog signals on sensing variations in Z-direction acceleration, the output of which Z-directional transducer 27 extends to an analog-to-digital converter 28, the output of which is also connected to an input of the microprocessor 23 which electronically processes its input signals in a manner described hereafter.

Also connected to microprocessor 23 is an output of a stable accurate clock oscillator 29 having a quartz-crystal feedback signal generator 30 and an output which not only serves to synchronize and sequence the operation of microprocessor 23 but also provides timing pulses to a digital clock circuit 31 which generates digital signals indicative of the real time and, in certain instances, date on an input to microprocessor 23. As shown in FIG. 5, time and date setting switches 17 may be provided and supported within housing 11. If not so provided, system 10 may operate by counting elapsed time signals generated when the system is started in its operation.

Control of the circuitry of system 10 is effected by utilizing microelectronic processor 23 which receives its instructions in the form of signals generated as programmed into a program memory 31. During the operation of the performance analyzing system 10 microprocessor 23 serves to control the periodic recording of information received from the X, Y and Z accelerometer sensors 22, 25 and 27 together with time and date signals output by digital clock 29, which signals are presented to a performance or acceleration signal recording memory 21 which may comprise a microelectronic serial CCD shift register, read-only [RAM] memory or other suitable type of memory which retains such recordings therein even if the operational power fails or is removed from the system.

At any desired time, such as during a routine monitoring function or after a mishap or accident involving the vehicle, memory 21 may be queried or addressed by means of signals generated by an external computer or calculator and its contents, which are indications of accelerations and decelerations experienced by the vehicle either over a period of time or during a time interval preceding the accident or mishap, may be analyzed by such computer, the results of which analysis may be displayed and/or printed out for evaluation or the establishment of a permanent record. Means for effecting such analysis include an input-output [I/O] port 32, such as a modem, which interfaces microprocessor 23 with either a direct access port 12, such as a plug-in connection, and/or with a short wave receiver 33 and transmitter 34. Two-way communication may thus be effected with an external computer having its own short wave transmitter and receiver, by means of receiving and transmitting antennas 13 and 14. For identifying the specific vehicle in which system is employed, a code specific to such vehicle may be provided recorded in or as part of the construction of the microprocessor 23 which is adapted to generate such specific code either immediately prior to or after controlling the short wave transmission of information provided in the performance memory 21.

In FIG. 3 is shown one form of a computerized monitoring system for querying and receiving data from system 10. Such system, denoted 10M may communicate with system 10 by means of cable or wire connected to a pluggable connector 35 which may be manually or otherwise connected to the input-output connector 12 of FIG. 2. Also provided in FIG. 3 are a short wave receiver 36 and transmitter 37, having their respective attendant antennas 38 and 39 for communicating with the respective transmitter 34 and receiver 33 of system 10 illustrated in FIG. 2. The output of receiver 36 and the input to transmitter 37 are respectively connected to the input-output interface 40 of a computer 41 and the connector 35 is also connected to such interface, as illustrated to permit computer 41 to generate and transmit query signals to system 10A and receive information recorded in memory 21 and reproduce therefrom under the control of microprocessor 23. The results of the analysis of the signals received performed by digital computer 41, are applied to drive or activate a visual display 43 and a printer 42. Display 43 may be supplemented or replaced with a video terminal including a cathode ray tube or the like for displaying the computer generated information and/or a voice synthesizer computer for generating speech signals which are converted to sounds of speech in a speaker, which speed may be indicative of the information generated by computer 41 which may indicate the operational conditions of the vehicle during one or more selected periods of time such as immediately preceding and during an accident, mishap or unsafe driving condition.

FIG. 4 illustrates certain details of the control system associated with a power supply for the performance monitoring system 10. During operation of the vehicle, operational power is derived from the vehicle battery 45 and from power generated directly by the voltage regulator circuit 46 through an isolation circuit 47 such as a diode. Voltage regulator 46 thus provides operational power of the appropriate voltage and parameters necessary to properly operate system 10. In event that power from the vehicle battery is severed or ceases as the result of an accident or other occurrence, an emergency battery 48, preferably of the rechargable type, is provided which applies operational power to system 10 through an isolation diode 49 and regulator 46. The condition of battery 48 is maintained at a given level during the normal operation of the vehicle battery 45 through a battery charging circuit 50 connected to receive charging energy from such vehicle battery 45.

In FIG. 5 is shown a modification to the logging system which operates essentially as described in the description of FIGS. 2–4. In addition to the accelerometer sensors 22, 25 and 27, a speed signal generating sensor 55 is provided, which may be connected to or comprise the speedometer of a motor vehicle, the output analog signal of which is converted to digital code signals by means of an analog-to-digital converter 56 and such code signals are applied to microprocessor 23. Also provided is a vehicle direction sensor 57 as an electronically sensed compass, the output of which is converted to digital form by its analog-to-digital converter 58 and applied to microprocessor 23. Other sensors of vehicle performance, such as engine operational performance, impact force sensors, engine throttle position, brake temperature, brake force, etc. may also be provided and connected to microprocessor 23 which may be operated to controllably output such signals or signals derived therefrom to the performance memory 21 to be recorded therein together with such described time and date signals as well as the acceleration and deceleration signals.

Certain parameters, such as ideal or maximum vehicle performance parameters, may be programmed in program memory 31 and such parameters may be compared, by means of microprocessor 23, with the actual operating parameters of the vehicle at any time. If such preprogrammed parameters are exceeded, microprocessor 23 will be operated to activate an alarm 18, such as a bell or tone generator, through an alarm driver 59 and may thereafter generate digital codes indicative of such operating conditions which may be recorded in memory 21 and applied to activate a display 16 through a display driver 60 when an electronic single-pole-double-throw switch 61 is closed. The display driver 60 converts the code to a form which may be displayed on the display 16, preferably in the form of characters which indicate the dangerous condition, which the vehicle is operating, to the driver of the vehicle.

When not displaying dangerous or hazardous vehicle operation or hazardous performance operation relating to the vehicle motor or engine, the display 16 may be employed to display current vehicle operation each time the switch 61 is toggled by a signal output by clock 31 providing such displayed information or changes therein periodically to the operator of the vehicle. Other features of the system illustrated in FIG. 5 include the provision of an auxiliary memory 21A which may form part of or be connected directly to microprocessor 23 wherein that performance memory 21 is pluggably connectible to system 10 and capable of being removed for replacement or for providing its recordings to operate an external display or to be applied to a computer external of system 10, for monitoring and recording purposes.

In the schematic electronic diagrams illustrated in FIGS. 2 to 5 it is assumed that the correct power supplies are provided on the correct sides of all electronic and electromechanical components and subsystems to provide proper operation of the system and subsystems as described. Such power supplies have been omitted for the purpose of simplifying the drawings.

Variations in the described vehicle performance monitor are noted as follows:

(a) The monitoring device may be connected to the battery of the motor vehicle through the ignition switch of the vehicle while an auxilliary battery is provided to maintain the memory properly functioning at all times, assuming that such memory is a RAM type memory.

(b) The vehicle monitoring device may contain its own battery for powering the electronic circuits thereof at all times, preferably in a standby mode when the vehicle is not operating, wherein the vehicle operating mode is attained when the ignition switch is closed or after sensing a variation in acceleration which sensing activates a suitable time delay switch to close and connect the circuits illustrated to a higher power input than when the vehicle is not operating wherein low power drain of the battery is maintained to power the memory, the sensing circuit and a short wave receiving circuit to assure that the device may be queried from a remote monitor station to attain the recorded data via short wave when the vehicle is stationary or not operating.

I claim:

1. A vehicle performance measuring and indicating apparatus comprising in combination:
    first means for sensing variations in acceleration of a motor vehicle as it travels and generating output electrical signals which vary in accordance with variations in the accelerations sensed thereby,
    second means for sensing variations in the direction of travel of said vehicle and generating output electrical signals which vary in accordance with variations in the direction travelled by said vehicle,
    third means for generating time indicating signals, and
    fourth means operable to control said first and second means to cause said first and second means to respectively sense vehicle acceleration and the direction of travel of said vehicle at select time intervals and to generate respective electrical signals along with said time indicating signals generated by said third means at select time intervals,
    fifth means including a memory for simultaneously recording each of the groups of signals generated by said first, second and third means at said select time intervals,
    sixth means for reproducing from said memory the information defined by the operation of said first, second and third means as groups of electrical signals and seventh means for analyzing said groups of electrical signals,
    said seventh means including electronic computing means for determining how a vehicle containing said first, second and third means has been operated.

2. An apparatus in accordance with claim 1 wherein said first, second third, fourth and fifth means define a unitary device supportable within a vehicle.

3. An apparatus in accordance with claim 1 including a unitary housing supporting containing said first, second and third, fourth and fifth means.

4. An apparatus in accordance with claim 3 including removable coupling means supported by said housing for connecting said fifth means to said first, second and third means within said housing.

5. An apparatus in accordance with claim 4 wherein said motor vehicle contains a battery for operating said vehicle, further including electrical connection means for connecting said first, second third, fourth and fifth means to said battery of said motor vehicle.

6. An apparatus in accordance with claim 5 including switch means connected between said first, second and third signal generating means and said battery of said motor vehicle.

7. An apparatus in accordance with claim 5 wherein said motor vehicle includes an ignition switch connected to said battery and said first, and second means are connected to be energized by said battery of said motor vehicle through said ignition switch of said motor vehicle.

8. An apparatus in accordance with claim 1 including a shortwave transmitting means connected to receive and shortwave transmit information signals of the information generated by said first means and second means, shortwave receiving means located remote from said first and second means and operable to receive the shortwave signals transmitted by said shortwave transmitting means, said seventh means being operable to perform computing functions with respect to the shortwave signals received by said shortwave receiving means for detecting the performance of said vehicle.

9. An apparatus in accordance with claim 8 including a display at said remote location for displaying an indication of the operation of said vehicle containing said first, said second and said third means.

10. An apparatus in accordance with claim 9 including recording means at said remote location for recording information received by said shortwave receiving means defining the operational characteristics of said motor vehicle.

11. A method of monitoring the operation of a motor vehicle comprising:
   disposing an acceleration sensing means in a motor vehicle,
   periodically energizing said acceleration sensing means as said motor vehicle operates to cause it to sense variations in acceleration of said vehicle as it travels and to periodically generate output electrical signals, generating different code signals indicative of time each time said acceleration sensing means is periodically energized and transmitting said code signals along with respective of said analog signals generated by said acceleration sensing means, receiving said analog signals and said code signals and computer processing said analog signals and generating digital signals indicative of variations in the acceleration of said vehicle during its travel and the times at which said variations occurred, recording said digital and code signals in a memory in the order they are generated and, when it is desired to indicate the performance of said vehicle, selectively reproducing the signals recorded in said memory and computer analyzing same and generating control signals, and applying said control signals to control the operation of an intelligible indicating means for indicating the manner in which said motor vehicle was operated during a select period of time.

12. A method in accordance with claim 11 wherein said monitoring is effected with respect to a plurality of operating motor vehicles, said method including generating a code unique to each of said motor vehicles each time its acceleration sensing means is energized and recording said unique code together with information defining the operation of the motor vehicle for which the unique code is generated.

13. A method in accordance with claim 12 including periodically reproducing the recordings of said digital signals and shortwave transmitting same to a remote receiver and computer analyzing said digital signals at said remote receiver.

14. A method in accordance with claim 13 which includes intelligibly indicating at said remote location the identification of each motor vehicle monitored together with information relating to its operation.

15. A vehicle performance measuring and indicating system comprising in combination:
   first means for sensing variations in the acceleration of a motor vehicle as it travels and generating output electrical signals which vary in accordance with variations in the acceleration sensed, said first means being supported by said vehicle,
   second means for generating code signals identifying said motor vehicle,
   third means for generating time indicating signals,
   fourth means including a memory supported by said vehicle and operable for simultaneously recording the information defined by the signals generated by said first, second and third means,
   fifth means for querying said memory and generating information signals defined by the signals which are generated by said first, second and third means and analyzing same,
   sixth means including an electronic computing means for receiving said information signals, processing and analyzing same and generating code signals indicative of the manner in which the vehicle supporting said first means has been operated and
   seventh means communicating with said sixth means and operable in response to code signals generated thereby to intelligibly indicate how said motor vehicle has been operated.

16. A system in accordance with claim 15 wherein said seventh means includes a visual display controlled in its operation by said electronic computing means to display information indicative of the manner in which said motor vehicle has been operated.

17. A system in accordance with claim 15 wherein said seventh means is located exterior of said motor vehicle.

18. A system in accordance with claim 17 including wireless communication means for communicating signals indicative of the operation of said motor vehicle to said seventh means.

* * * * *